United States Patent Office 3,540,176
Patented Nov. 17, 1970

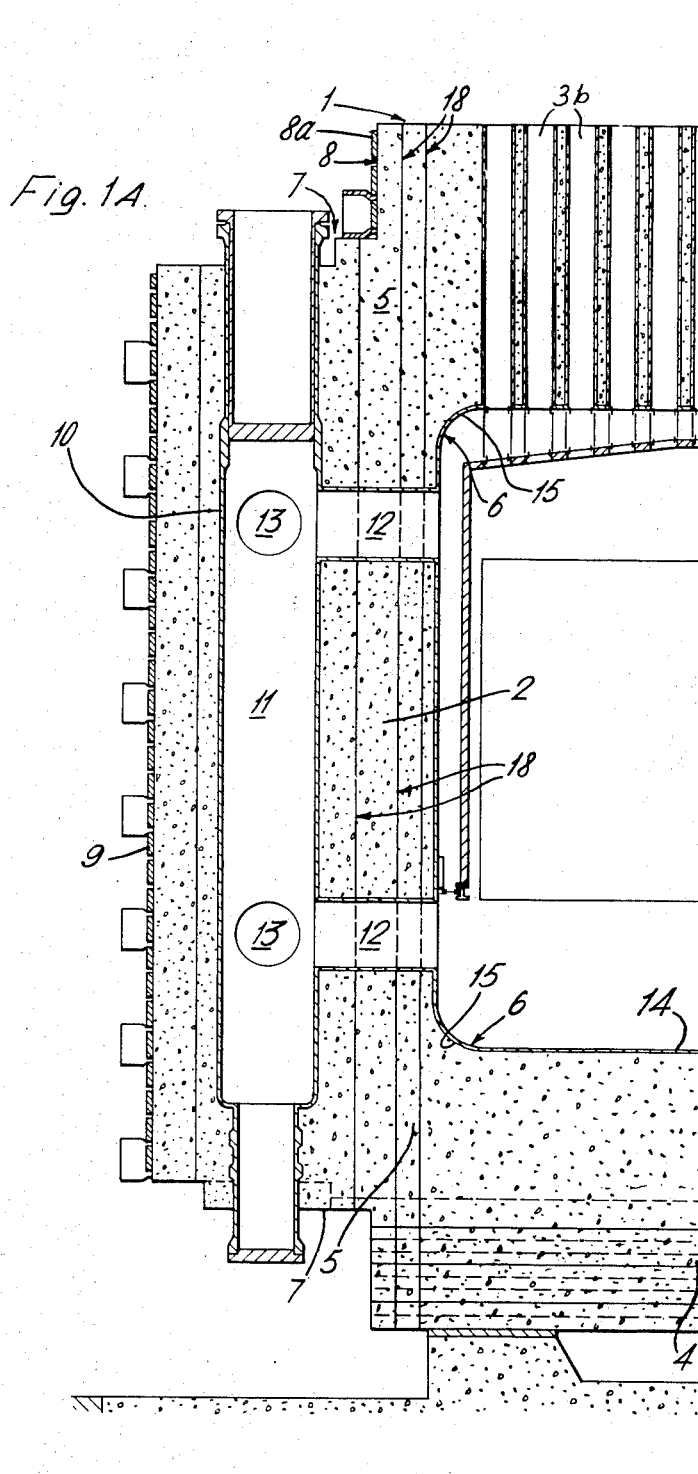

3,540,176
PRESTRESSED CONCRETE PRESSURE VESSELS
Samuel Brittan Hosegood, Arne, Wareham, and Alfred Norman Kinkead, Dorchester, England, assignors to United Kingdom Atomic Energy Authority, London, England
Filed Dec. 1, 1966, Ser. No. 598,436
Claims priority, application Great Britain, Dec. 6, 1965, 51,721/65
Int. Cl. E04c *3/10;* E04g *11/04*
U.S. Cl. 52—224                1 Claim

ABSTRACT OF THE DISCLOSURE

A prestressed concrete pressure vessel for a nuclear reactor has a right cylindrical side wall containing holes extending parallel with the longitudinal axis of the vessel, end walls for the vessel, a peripheral step in the rim formed at the junction between the side wall and one end wall, providing a radially outwardly directed face, and prestressing means applied peripherally around this face and further prestressing means applied to prestress the side walls.

---

Figure 1B:
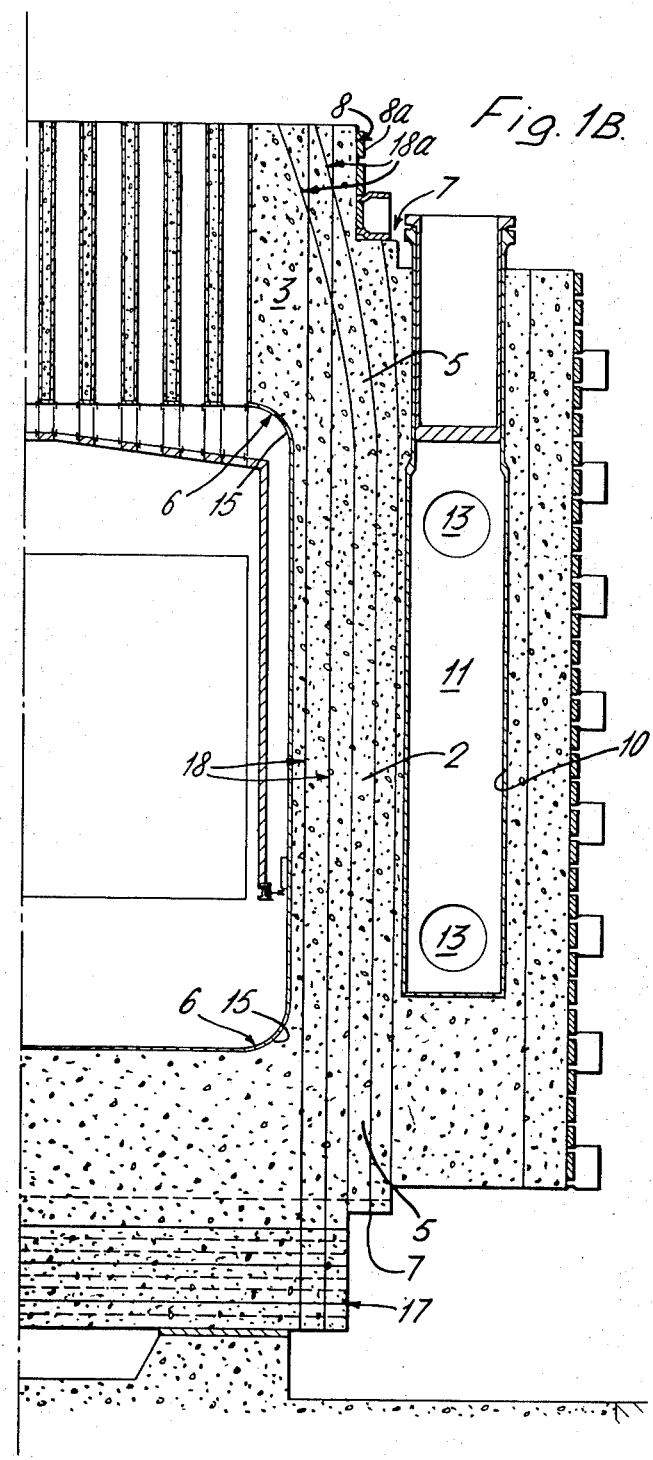

This invention relates to prestressed concrete pressure vessels by which phrase we mean all concrete pressure vessels which are reinforced by steel or other cables or like members which are under tension even when there is no pressure to withstand so that standing compressive stresses are set up in the concrete. The invention is chiefly concerned with such pressure vessels adapted to contain nuclear reactors and ancillary equipment and which are required to have a number of penetrations which either afford access to the interior of the vessel or serve other purposes.

It will be appreciated that the provision of these penetrations restricts the designers' freedom to locate prestressing cables in the concrete and to meet this difficulty, for at least some of the in-concrete prestressing cables, there may be substituted externally applied stressing tendons, e.g., by winding cable or girdle about parts of the vessel periphery. There is obviously a limit to the extent to which this expedient can be applied, particularly in the case of the end walls of a cylindrical vessel since it is desirable that a compressive stress be transmitted throughout the volume of concrete not withstanding the penetration thereby of numerous access holes albeit strongly shuttered by steel liners well keyed into adjacent concrete.

In one design, which incidentally forms the subject of our copending patent application No. 515,997 an end wall of a right cylindrical vessel is pierced by a substantial number of penetrations to give access to the interior of the vessel and in addition by vertical cored holes which penetrate the vessel side wall. The latter holes, being arranged in at least one annular row, are provided to accommodate heat exchangers. This patent application discloses also a suggested pattern of in-concrete prestressing cables by means of which both the side walls and the end walls of a right cylindrical concrete pressure vessel may be prestressed. However, constructional difficulties are much reduced by the availing of external cable wrapping in place of at least some cables laid in concrete. According to the present invention there is provided a prestressed concrete pressure vessel for a nuclear reactor of substantially cylindrical form having holes for the reception of heat exchangers in the prestressed cylindrical wall characterised in that a peripheral step is provided in at least one end face of an end wall to facilitate prestressing of the wall.

This artifice is liable to render the vessel susceptible to the criticism that the junction between the side walls and the top slab is weakened structurally. However, stress analysis in the area of the junction between the end and side wall of a conventional cylindrical vessel with flat ends commonly shows the stresses near the outer corner (i.e., in the part which is removed to incorporate a stepwise reduction in diameter) are normally low, whereas near the inside corner undesirable tensile stresses are liable to occur. Stress concentrations in this area can be reduced by introducing a suitably shaped toroidal section intermediate with the side wall and end wall and, by using such a section in conjunction with the stepwise reduction in outer diameter and a suitable arrangement of the prestressing cables, adequate strength can be ensured.

According to the invention in another aspect there is provided a prestressed concrete reactor pressure vessel of right cylindrical side walls containing holes extending parallel with the longitudinal axis of the vessel, a circumferential step in the outside diameter formed in the junction between an end wall and the side wall, prestressing means applied peripherally to the end wall and longitudinally in the side wall, and said vessel also having a toroidal section between the side walls and the end wall formed to reduce stress concentrations at the inside of the junction.

Figure 2A:
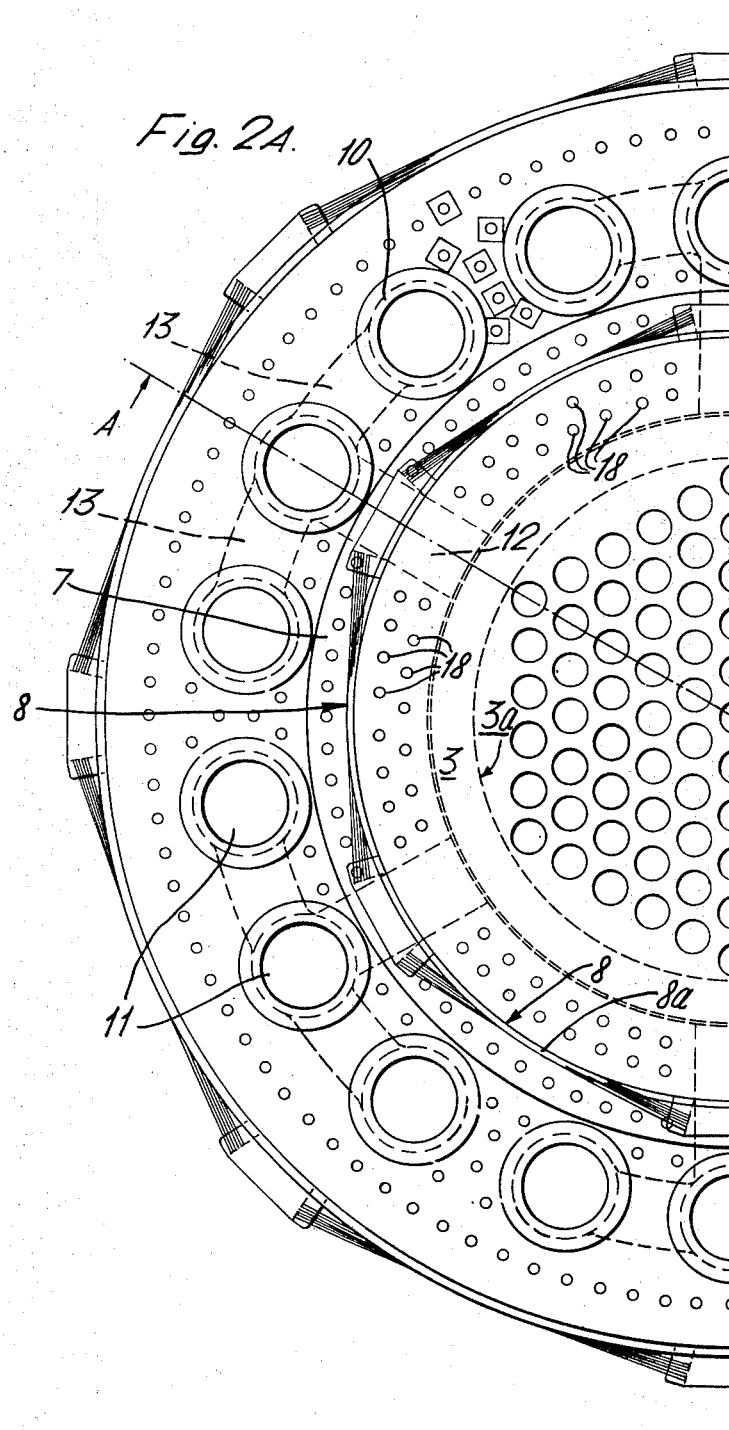
Figure 2B:
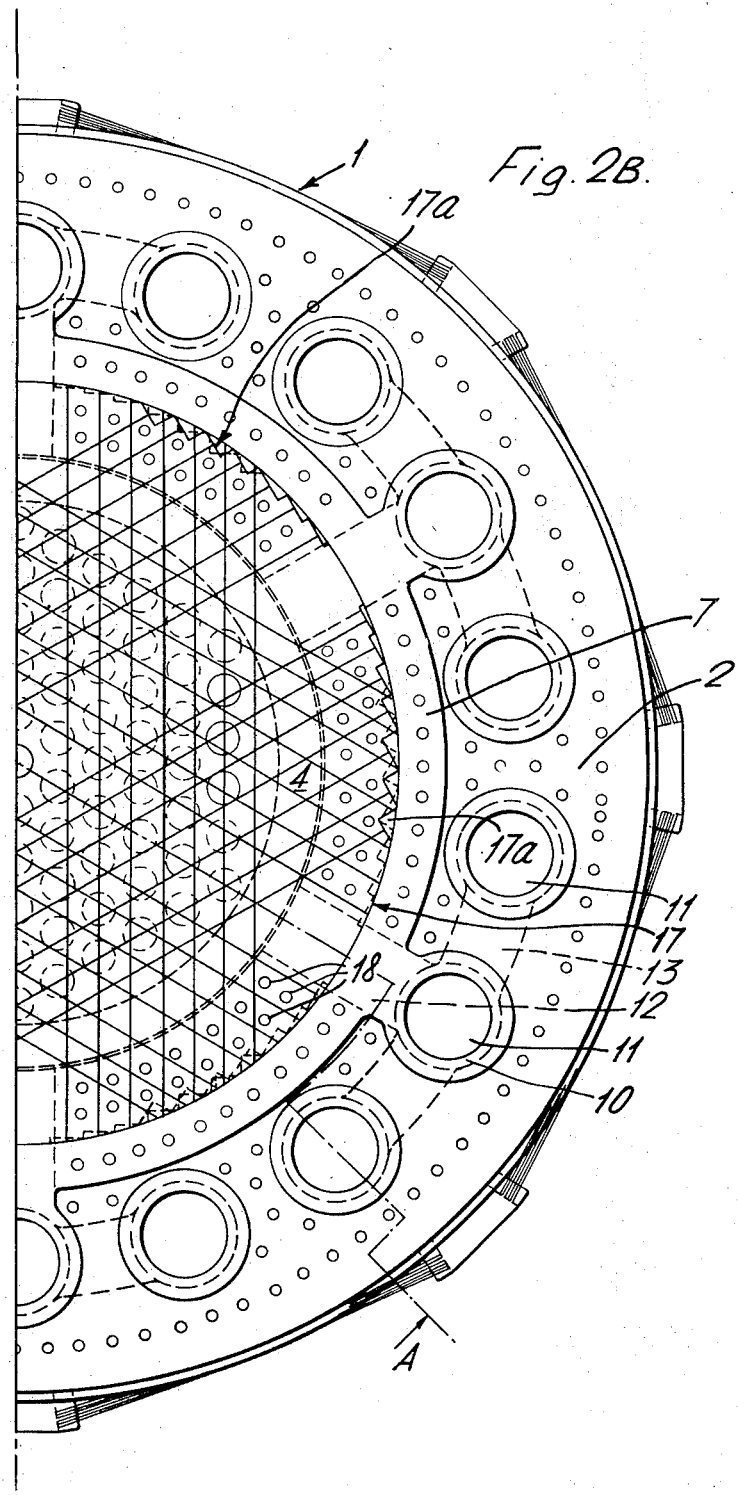

A prestressed concrete pressure vessel embodying the invention is shown in the accompanying drawings:

FIGS. 1A–1B of which is an axial cross section through a right cylindrical concrete pressure vessel taken on the line A—A of FIG. 2 and FIGS. 2A–2B is a plan view of FIG. 1, being on its left-hand side a view from above and on its right-hand side a view from below.

In the drawings a pressure vessel 1 has cylindrical side walls 2 and end walls 3, 4, respectively. The central zone bounded by dotted line 3a of the upper end wall 3 is pierced by a large number of closely spaced closable penetrations 3b to give access to the interior of the vessel. Between the side walls 2 and each of the end walls 3, 4 there is interposed a toroidal section 5 at least the inner surface of which is smoothly curved at 6. Alternatively, an approximation to this smooth curve can be achieved by one or more fillets, say one fillet at approximately 45° with or without blending radius junctions with the end and side walls. At the outer surface of the junction between the end and side walls the end wall 3, is a stepped portion at 7 to provide a peripheral face 8 of reduced diameter for prestressing devices 8a. The latter preferably take the form of a high tensile cable wound peripherally around the end wall on the face 8 so putting the end wall into compression, but alternatively or in addition there can be curved reinforcing cables within the toroidal section.

In this example the lower end wall 4 is not pierced by closely spaced penetrations and chordal prestressing cables 16 are laid in the concrete. The lower end step 17 is accordingly formed with suitable plane faces as at 17a spaced around its periphery (shown dotted in FIG. 2) so as to give anchorage/tensioning points for the cable ends on the plane faces.

As shown also the side walls 2 of the vessel are prestressed mainly by an externally wound cable 9 in the manner described in our copending patent application No. 515,997. This allows design freedom in the disposition of shutter tubes 10 for the holes 11 which accommodate heat exchangers as described in our copending patent application No. 515,997 which intercommunicate with the interior of the vessel 1 via lateral ducts 12 and with one another by ducts 13 (FIG. 2). Alternatively, the cable 9 may be replaced by curved cables laid in the marginal concrete each extending around ⅔ of the periphery and secured to extendable butresses.

As is common in prestressed concrete pressure vessel construction, the interior of the vessel is lined with a steel plate lining 14 and this, being preformed with curved corners 15 provides suitable shuttering for the concrete during construction. As an example, the interior diameter of the vessel may be 30 feet, its height 40 feet and the corners radiused at 3 feet 6 inches.

Stress analyses to a rough approximation have shown that the toroidal section 5 introduced at the junction between the side wall 2 and end walls 3, 4 so reduces the stress concentrations at these points as to allow the formation of the steps 7 in the outer surfaces of the pressure vessel without significantly weakening the structure at these points.

The diameter of the step is made sufficiently greater than the internal diameter of the vessel to permit the incorporation of sufficient straight vertical prestressing cables 18 passing through the side walls and the full thickness of the ends (inside the step diameter) to resist the axial pressure thrust on the ends. Alternatively, these cables may be curved inwards at their ends (as shown at 18a) to further reduce the tendency for tensile stresses to occur at the inner part of the toroidal section.

The attendant advantages, apart from the saving of concrete, are the comparative ease with which accurate stressing calculations may now be performed due to the toroidal section thus facilitating the acceptance of this stepped construction, this ease of calculation allows easier and more effective prestressing arrangements for the end walls together with the improved access to the heat exchanger ducts in shutter tubes 10. The length of the heat exchanger access holes is also reduced, resulting in a significant reduction in the height to which a heat exchanger must be lifted during their removal or insertion. The step may also provide a useful space below the charge face level for accommodation of steam and feedwater mains and headers.

We claim:

1. A prestressed concrete pressure vessel having a right cylindrical side wall containing holes extending parallel with the longitudinal axis of the vessel, end walls for the vessel, means defining a diameter-reducing peripheral step in the rim formed at the junction between the side wall and one end wall, providing a radially outwardly directed face of reduced diameter and a second face normal to said radially outwardly directed face from which the second face access into said holes is obtained, prestressing means applied peripherally around said face and further prestressing means applied to prestress the side walls.

References Cited

UNITED STATES PATENTS

| 273,742 | 3/1883 | Kent | 52—224 |
| 2,932,964 | 4/1960 | Dobell | 52—224 |
| 3,025,992 | 3/1962 | Humphrey | 220—71 |
| 3,034,537 | 5/1962 | Seaman et al. | 52—224 |
| 3,297,542 | 1/1967 | Costes | 176—60 |

FOREIGN PATENTS 238,809  6/1962  Australia.

FRANK L. ABBOTT, Primary Examiner

J. L. RIDGILL, JR., Assistant Examiner

U.S. Cl. X.R.

220—3; 176—60